United States Patent [19]
Johnson

[11] Patent Number: 5,815,325
[45] Date of Patent: Sep. 29, 1998

[54] OPTICAL ASSEMBLY WITH DRIVE LINKAGE FOR A MOVABLE LENS ELEMENT

[75] Inventor: Dean A. Johnson, Churchville, N.Y.

[73] Assignee: Eastman Kodak Company, Rochester, N.Y.

[21] Appl. No.: 741,995

[22] Filed: Oct. 31, 1996

[51] Int. Cl.⁶ .................................................. G02B 15/14
[52] U.S. Cl. ........................................................ 359/696
[58] Field of Search ...................... 359/696, 697, 359/698, 694, 703, 704, 822, 823, 825, 826

[56] References Cited

U.S. PATENT DOCUMENTS

| | | | |
|---|---|---|---|
| 5,029,992 | 7/1991 | Richardson | 359/696 |
| 5,144,491 | 9/1992 | Ushiro et al. | 359/697 |
| 5,150,260 | 9/1992 | Chigira | 359/694 |
| 5,319,498 | 6/1994 | Hara et al. | 359/824 |
| 5,377,048 | 12/1994 | Tada et al. | 359/823 |
| 5,391,866 | 2/1995 | Hoshio et al. | 250/201.2 |
| 5,631,776 | 5/1997 | Weigand et al. | 359/694 |
| 5,640,278 | 6/1997 | Mogamiya | 359/822 |

FOREIGN PATENT DOCUMENTS 4-141611  5/1992  Japan ....................................... 359/822

Primary Examiner—Georgia y. Epps
Assistant Examiner—Ricky Mack
Attorney, Agent, or Firm—David M. Woods

[57] ABSTRACT

A lens assembly comprises a lens barrel assembly for supporting a lens barrel, one or more guide members for guiding the movement of the lens barrel assembly in the direction of an optical axis, a gear shaft rotatable by a primary mover, and a drive linkage for coupling the lens barrel assembly with the gear shaft. In particular, the drive linkage has a drive nut portion meshing with the gear shaft over a partial circumferential threaded section thereof and movable in the direction of the optical axis by the rotation of the gear shaft to thereby move the lens barrel assembly in the direction of the optical axis. The advantage of this design is that it allows for a compliant linkage between a lead screw motor and the lens barrel assembly, wherein the connection to the lead screw utilizes the section of the nut for thread engagement. By utilizing up to 180 degrees of thread engagement between the linkage and the lead screw, this design further allows for simplified assembly.

14 Claims, 2 Drawing Sheets

OPTICAL ASSEMBLY WITH DRIVE LINKAGE FOR A MOVABLE LENS ELEMENT

FIELD OF THE INVENTION

The invention relates generally to the field of photographic optics, and in particular to an optical assembly having a drive linkage between a primary mover and a movable lens barrel assembly.

BACKGROUND OF THE INVENTION

In order to make a power zoom lens assembly, or an autofocus lens, a connection must be made between a primary mover, such as a lead screw motor, and at least one moveable lens barrel assembly in an optical lens assembly. This connection needs to be rigid parallel to the optical axis of the lens barrel assembly to maintain the correct position of the lens elements in the lens barrel assembly. However, the connection also needs to be compliant in the remaining degrees of freedom to prevent binding between movable components in the finished assembly due to variation among the components, or variations in the assembly process. Previous designs have used either: 1) a sector of a large gear that meshes with the lead screw, or 2) a component with 360 degrees of internal threaded engagement around the lead screw. The first design ordinarily has only a single line contact with the lead screw and is prone to skipping threads under load. An example of the first design is seen in U.S. Pat. No. 5,150,260, which shows a two-piece rack gear engaging a lead screw, in this case providing two line contacts with the lead screw. The second design is more effective than the first as to avoiding thread skipping, but very costly to assemble onto the lead screw motor assembly.

The problem therefore is to allow for a compliant link between a lead screw motor and a lens barrel assembly by means of a connection which utilizes greater thread engagement to prevent thread skipping, while still permitting simplified assembly.

SUMMARY OF THE INVENTION

The present invention is directed to overcoming one or more of the problems set forth above. Briefly summarized, according to one aspect of the present invention, a lens assembly comprises a lens barrel assembly for supporting a lens barrel, one or more guide members for guiding the movement of the lens barrel assembly in the direction of an optical axis, a gear shaft rotatable by a primary mover, and a drive linkage for coupling the lens barrel assembly with the gear shaft. In particular, the drive linkage has a drive nut portion meshing with the gear shaft over a threaded partial circumference section thereof and movable in the direction of the optical axis by the rotation of the gear shaft to thereby move the lens barrel assembly in the direction of the optical axis.

The advantage of this design is that it allows for a compliant link between the gear shaft, e.g., a lead screw, and the lens barrel assembly, wherein the connection to the lead screw utilizes a section of a drive nut for thread engagement. By utilizing up to 180 degrees of thread engagement between the drive linkage and the lead screw, this design also allows for simplified assembly. Further, since the compliance preferably involves preloading the drive linkage, the bushing used to position the lens barrel assembly can also be biased to one side. Biasing the bushing allows for more accurate lens positioning even with increased allowable variation from the manufactured components.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because optical devices employing movable elements are well known, the present description will be directed in particular to elements forming part of, or cooperating more directly with, apparatus in accordance with the present invention. Elements not specifically shown or described herein may be selected from those known in the art.

Figure 1:
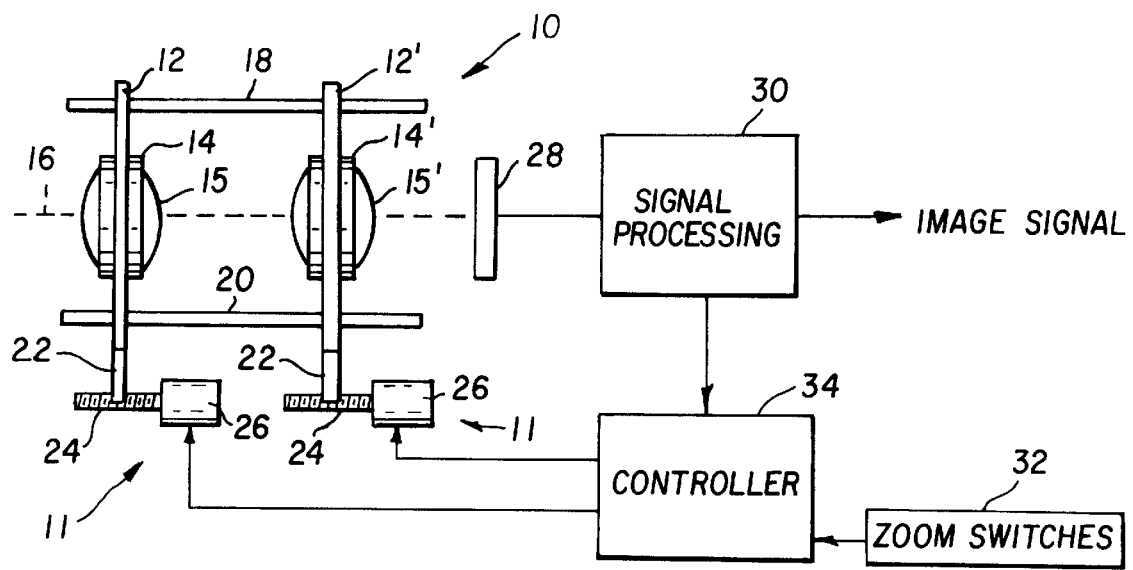
FIG. 1 is a combined side view and block diagram of a lens assembly and associated components according to a preferred embodiment of the invention.

FIG. 1 is a side view, partly in cross section, of a lens assembly 10 and associated lens driving assemblies 11 for providing motorized control of optical elements within the lens assembly 10. Such motorized control may, e.g., provide power zooming and/or automatic focus. In this example, a lens barrel assembly 12 supports a first lens barrel 14 for movement parallel to the direction of an optical axis 16, and another lens barrel assembly 12' supports a second lens barrel 14' also for movement parallel to the direction of the optical axis 16. Each lens barrel 14 and 14' supports respective lenses 15 and 15'. The combined movement of the lens barrels 14 and 14' provides a zooming action, and one or more of the lens barrels may additionally provide automatic focusing of the lens assembly 10. The lens barrel assemblies 12 accordingly slide along a pair of guide shafts 18 and 20, which are each arranged parallel to the optical axis 16. A drive linkage 22 provides a compliant interconnection between each lens barrel assembly 12, 12' and a primary mover. In the preferred embodiment, the primary mover for each lens barrel assembly 12, 12' is a lead screw 24 connected to an output shaft of a motor 26.

In operation, the lens assembly 10 directs an image upon a solid state image sensor 28, such as a charge coupled device image sensor. An output signal generated by the image sensor 28 is processed in the signal processing section 30 and output as an image signal. Power zooming is obtained by actuation of zoom switches 32, which are connected to a controller 34. The controller 34 accordingly provides driving signals to the lens driving assemblies 11, which in turn are connected to the first and second lens barrel assemblies 12, 12'. Operation of the zoom switches 32 thereupon causes the lens barrel assemblies 12 and 12' to move and to provide different zooming ratios. The signal processing section 30 may also extract certain parameters, such as contrast information, and output these parameters to a controller 34. If the optical assembly 10 is providing autofocus, the controller 34 then obtains distance information from these parameters and generates a lens focusing signal. The motor 26 for one of the lens barrels 14, and the lead screw 24 therewith, is accordingly driven by the lens focusing signal from the controller 34 to move the lens barrel assembly 12 until the lens barrel 14 optimizes the focus of an image to a given focal plane location when an object distance is changed.

Figure 2:
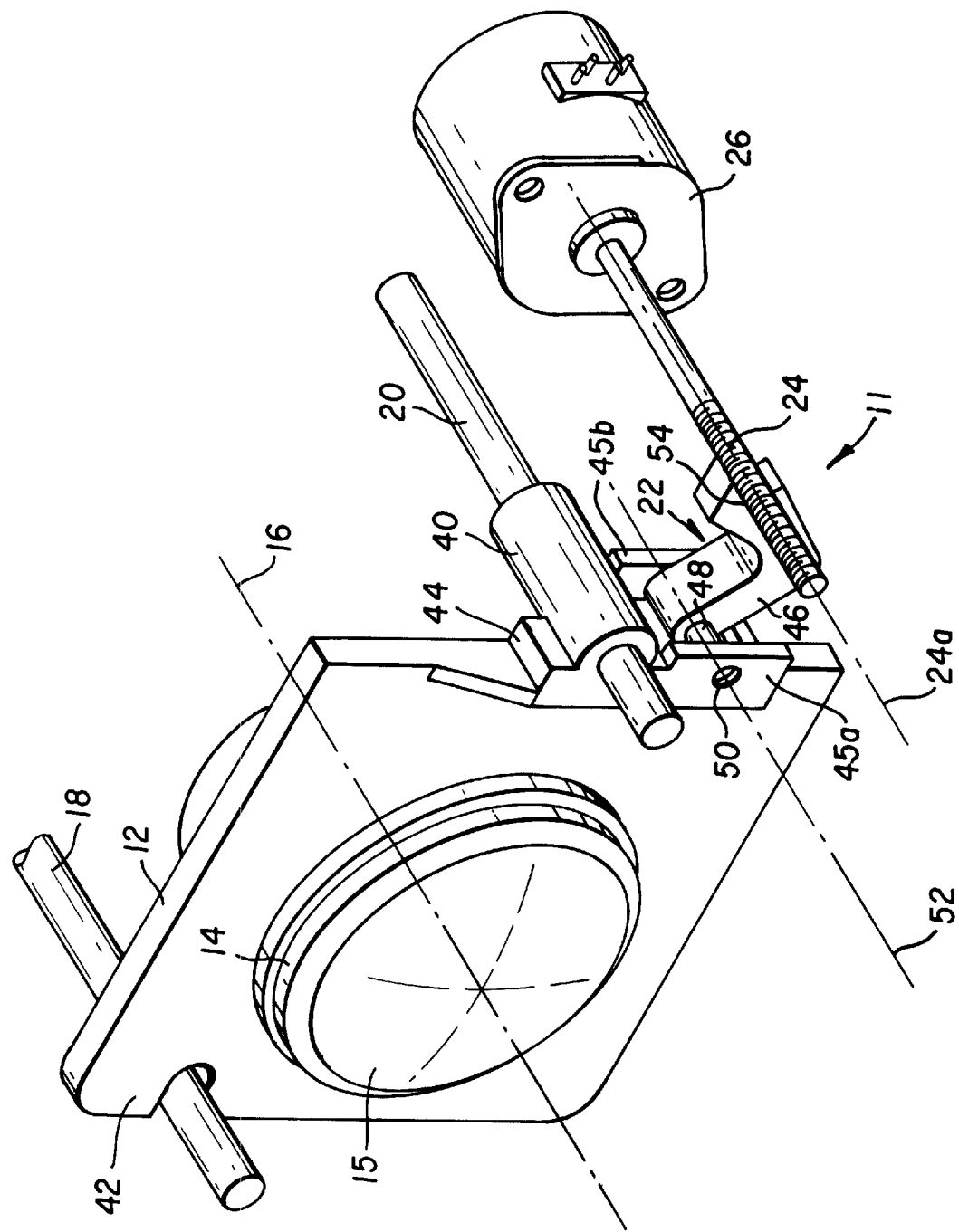
FIG. 2 is a detailed view of one of the lens driving assemblies shown in FIG. 1.

The details of one of the lens driving assemblies 11 and the associated lens barrel assembly 12 are shown in FIG. 2. The lens barrel 14 is rigidly supported in the lens barrel assembly 12 for movement along the optical axis 16 on the guide shafts 18 and 20. The lens barrel assembly 12 includes a support bushing 40 for engaging the guide shaft 20 and positioning the lens barrel assembly 12 and the lens barrel 14 therewith. The lens barrel assembly 12 further includes a slotted guide section 42 for engaging the other drive shaft 18 and preventing rotation of the lens barrel assembly 12. These connections to the drive shafts 18 and 20 allow movement of the lens barrel 14 parallel to the optical axis 16 while constraining movement of the lens barrel 14 in the remaining degrees of freedom. The lens barrel assembly 12 includes an abutment 44 on one side thereof for pivotably supporting the drive linkage 22. The abutment includes two side walls 45a and 45b having holes (one hole 50 being shown) defining a drive linkage pivot center line 52. A post 48 on one end of the drive linkage 22 mates with the holes 50, which allows rotation of the drive linkage 22 about the drive linkage pivot center line 52. The other end of the drive linkage 22 terminates in a threaded nut section 54, which engages a threaded cross section of the lead screw 24 over a partial circumference thereof.

The drive linkage 22 incorporates a V-shaped central section 46 made of a deformable material, which allows the linkage 22 to elastically deform to a center line location 24a of the lead screw 24 extending from the motor 26. (Ordinarily, the entire drive linkage 22 would be molded of a deformable material, such as plastic.) This allows the drive nut section 54 to fully engage the lead screw 24 without producing torques that could introduce binding in the lens barrel support bushing 40. In assembly, the drive linkage 22 is preloaded to snap into place between the pivot hole 50 in the abutment 44 and the lead screw 24. Such preloading effectively eliminates the functions of the pivot in the drive linkage 22 and generates a rigid coupling between the drive linkage 22 and the lens barrel assembly 12. Thus, were it not for assembly convenience, it is possible that the drive linkage 22 could be integrally formed with the lens barrel assembly 12.

Figure 3:
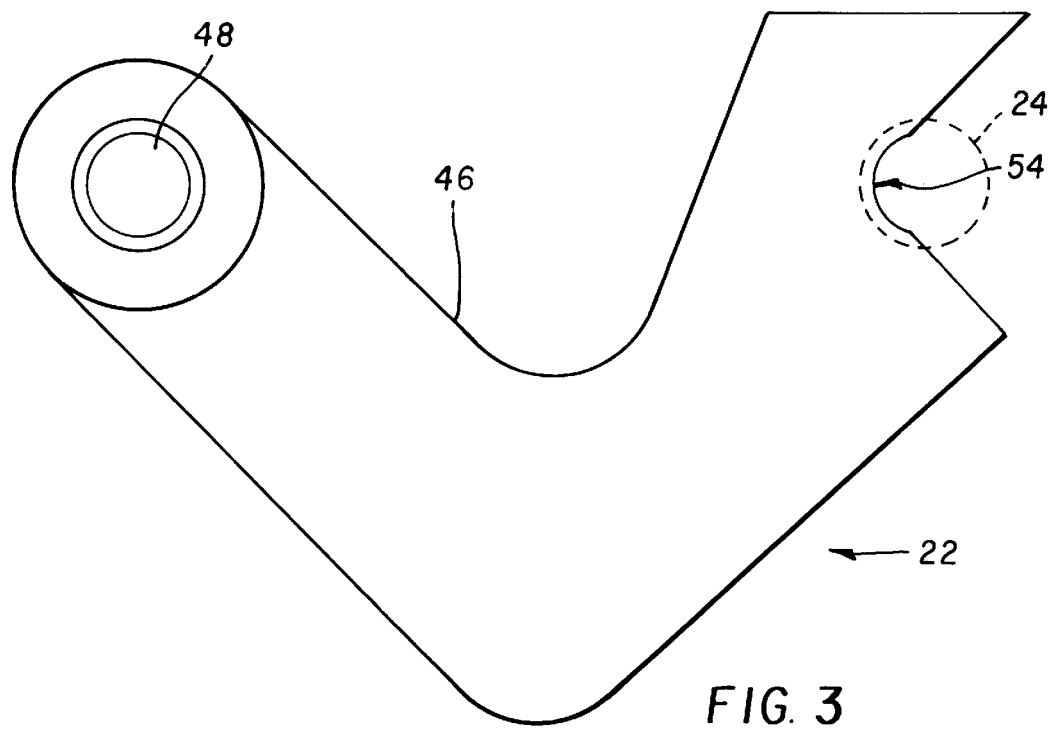
FIG. 3 is a cross section view of the drive linkage shown in FIG. 2.

As the drive linkage 22 is shown in cross section in FIG. 3, the threaded nut section 54 provides continuous engagement with the lead screw 24 (shown in broken lines in FIG. 3) over an arcuate section of the lead screw threads. Given the deformability of the V-shaped central section 46, this design allows for a compliant link between the lead screw 24 extending from the motor 26 and the post 48 connection through the lens barrel assembly 12 to the lens assembly 10. Moreover, the interconnection with the lead screw 24 utilizes a partial circumference section of a nut for thread engagement. By utilizing up to 180 degrees of thread engagement between the linkage 22 and the lead screw 24, this design also allows for simplified assembly. The lead screw 24 need only be nested into place against the nut section 54 while the drive linkage 22 is snapped into place against the pivot holes 50. Further, since the compliance involves preloading the drive linkage 22, the bushing 40 used to position the lens barrel assembly 12 is also biased to one side by the drive linkage 22 to eliminate any clearance in the bushing. Biasing the bushing 40 therefore allows for more accurate lens positioning even with increased allowable variation from the manufactured components.

The application for this device would include a lens assembly 10 that needs to move one group of lenses 15 (or 15') to adjust the focus position of a camera, or for a camera that needs to reposition multiple lens groups 15 and 15' to change the magnification of the lens assembly 10. While a guide shaft arrangement is shown in FIG. 2, the assumption is that the lens or lenses 15 and 15' that need to be repositioned are mounted in lens barrel assemblies 12, 12' that can move/slide along the optical axis, without binding, but which are essentially fixed in all other degrees of freedom. The drive linkage 22 is mounted in a pivot, where the axis 52 of the linkage pivot is parallel to the optical axis 16.

Since the design of the drive linkage 22 incorporates a V-shaped central section 46, the drive linkage 22 may elastically deform to the location of the lead screw motor. Although the lead screw center line 24a is nominally parallel to the linkage center line 52 and the optical axis 16, normal variations during the assembly process will typically cause slight variations. Consequently, the linkage design is such that there is always some amount of deformation of the link when all the components have been assembled. This design allows the threaded portion of the linkage 22 to follow the lead screw 24 without introducing any binding forces into the support bushings 40 used to locate the lens barrel assembly 12. The increased thread engagement also improves the wear life of the drive linkage 22 and significantly increases the force required to make the linkage "skip" a thread. This elastic deformation is also used to bias the lens bushing 40 on the guide shaft 20 to more accurately position the lens assembly 10. However, the elastic deformation is oriented such that it does not introduce any twisting moments that would generate the aforementioned binding forces.

The invention has been described with reference to a preferred embodiment. However, it will be appreciated that variations and modifications can be effected by a person of ordinary skill in the art without departing from the scope of the invention.

Parts list 10 lens assembly
11 lens driving assembly
12 lens barrel assembly
12' lens barrel assembly
14 lens barrel
14' lens barrel
15 lens
15' lens
16 optical axis
18 guide shaft
20 guide shaft
22 drive linkage
24 lead screw
24a lead screw center line
26 motor
28 image sensor
30 signal processing section
32 zoom switches
34 controller
40 support bushing
42 slotted guide section
44 abutment
45a, 45b walls
46 V-shaped central section
48 post
50 holes
52 drive link pivot center line
54 threaded nut section

I claim:

1. A lens assembly, comprising:

a lens barrel assembly for supporting a lens;

one or more guide members for guiding the movement of the lens barrel assembly in the direction of an optical axis;

a gear shaft rotatable by a primary mover; and a drive linkage for coupling the lens barrel assembly with the gear shaft, said drive linkage including a portion at one end attached to the lens barrel assembly and a drive nut portion at the other end and a compliant central section joining the respective ends, said drive nut portion meshing with the gear shaft over a threaded partial circumference section thereof and movable in the direction of the optical axis by the rotation of the gear shaft to thereby move the lens barrel assembly in the direction of the optical axis, said compliant central section permitting a deformable coupling between the lens barrel assembly and the gear shaft so that the drive nut portion fully engages the lead screw without producing binding torques between the lens barrel assembly and the primary mover.

2. The lens assembly as claimed in claim 1 wherein the drive nut portion provides up to 180 degrees of thread mesh engagement with the gear shaft.

3. The lens assembly as claimed in claim 1 wherein the gear shaft is a lead screw.

4. The lens assembly as claimed in claim 3 wherein the lens barrel assembly includes a bushing for positioning the lens barrel assembly, and the compliant central section allows the drive nut portion to fully engage the lead screw without producing torques that could introduce binding in the bushing.

5. The lens assembly as claimed in claim 1 wherein the coupling of the lens barrel assembly to the drive linkage comprises a pivotable mount, with the axis of the pivotable mount substantially parallel to the optical axis.

6. The lens assembly as claimed in claim 1 wherein the lens barrel assembly comprises two separate assemblies having separate lens groups that are being positioned, and the two lens groups are moved separately to produce a change in the magnification of the optical system.

7. The lens assembly as claimed in claim 6 wherein only one of the two lens groups is moved to optimize the focus of an image to a given focal plane location when an object distance is changed.

8. A lens assembly, comprising:

a lens barrel assembly including at least one lens supported in relation to an optical axis;

guiding means for allowing movement of the lens barrel assembly along the optical axis;

a primary mover including a motor and a lead screw having lead screw threads;

a linkage coupling the lens barrel assembly with the lead screw threads, wherein the linkage is mounted to the lens barrel assembly at one end and has a section of a drive nut on the other end and a compliant central section joining the respective ends to provide a deformable coupling between the lens barrel assembly and the lead screw threads, and the drive nut section provides up to 180 degrees of thread mesh engagement with the lead screw.

9. The lens assembly as claimed in claim 8 wherein the lens barrel assembly is supported by the guiding means on lens barrel support bushings and the compliant central section of the linkage is a compliant v-shaped section that allows the drive nut section to fully engage the lead screw without producing torques that could introduce binding in the lens barrel support bushings.

10. The lens assembly as claimed in claim 8 wherein the coupling of the linkage to the lens barrel assembly comprises a pivoting mount, with an axis of the pivoting mount substantially parallel to the optical axis.

11. The lens assembly as claimed in claim 10 wherein the linkage is preloaded against the lens barrel assembly such that the coupling of the linkage to the lens barrel assembly comprises a rigid mounting.

12. The lens assembly as claimed in claim 8 wherein the lens barrel assembly includes two separate assemblies having separate lens groups that are being positioned, and each of the two lens groups can be moved separately to produce a change in the magnification of the lens assembly.

13. The lens assembly as claimed in claim 12 wherein only one of the two lens groups is moved to optimize the focus of an image to a given focal plane location when an object distance is changed.

14. The lens assembly as claimed in claim 8 wherein the lens barrel is moved to optimize the focus of an image to a given focal plane location when an object distance is changed.

\* \* \* \* \*